US005143301A

United States Patent [19]

Reiter et al.

[11] Patent Number: 5,143,301

[45] Date of Patent: Sep. 1, 1992

[54] ELECTROMAGNETICALLY ACTUABLE VALVE

[75] Inventors: Ferdinand Reiter, Markgroeningen; Rudolf Babitzka, Kirchberg-Neuhof, both of Fed. Rep. of Germany

[73] Assignee: Robert Bosch GmbH, Stuttgart, Fed. Rep. of Germany

[21] Appl. No.: 752,436

[22] PCT Filed: Nov. 10, 1990

[86] PCT No.: PCT/DE90/00856

§ 371 Date: Aug. 19, 1991

§ 102(e) Date: Aug. 19, 1991

[87] PCT Pub. No.: WO91/10061

PCT Pub. Date: Jul. 11, 1991

[30] Foreign Application Priority Data

Dec. 21, 1989 [DE] Fed. Rep. of Germany ....... 3942306

[51] Int. Cl.[5] ........................ F16K 31/06; F02M 51/08

[52] U.S. Cl. ............................ 239/585.4; 251/129.18; 239/900

[58] Field of Search .................... 239/585; 251/129.18, 251/129.21

[56] References Cited

U.S. PATENT DOCUMENTS

| | | | |
|---|---|---|---|
| 4,403,741 | 9/1983 | Moriya et al. | 239/585 |
| 4,585,174 | 4/1986 | Knapp | 239/585 |
| 4,915,350 | 4/1990 | Babitzka et al. | 239/585 |
| 4,984,744 | 1/1991 | Babitzka et al. | 239/585 |

FOREIGN PATENT DOCUMENTS

| | | |
|---|---|---|
| 2212908 | 1/1973 | Fed. Rep. of Germany . |
| 3244290 | 6/1983 | Fed. Rep. of Germany . |
| 3301502 | 8/1983 | Fed. Rep. of Germany . |
| 2290582 | 6/1976 | France . |
| 2444812 | 7/1980 | France . |
| 2532005 | 2/1984 | France . |
| 2080627 | 2/1982 | United Kingdom . |
| 89/00244 | 1/1989 | World Int. Prop. O. . |

*Primary Examiner*—Andres Kashnikow
*Assistant Examiner*—Karen B. Merritt
*Attorney, Agent, or Firm*—Edwin E. Greigg; Ronald E. Greigg

[57] ABSTRACT

An electromagnetically actuable valve having an axial fuel inflow, in which the opening path of the valve closing element is limited by a stop rod device which permits a controlled opening stroke of the valve closing element as a function of a position of the valve needle. The stop rod is arranged concentrically with respect to the valve longitudinal axis so that the stop rod touches the valve closing element in the opening position of the valve and thus limits its opening stroke. The stop rod is mounted in a flow bore of a core of the valve by means of a displacement sheath. The design of the stop device is particularly suitable for fuel injection valves.

24 Claims, 2 Drawing Sheets

ELECTROMAGNETICALLY ACTUABLE VALVE

PRIOR ART

The invention is based on an electromagnetically actuable valve. German DE-PS 3,102,642 already discloses an electromagnetically actuable valve with axial fuel inflow, in which although a stop device which limits the opening path of the valve closing element is provided, depending on the skew position or deviation of the valve needle consisting of valve closing element, rod and armature, different stop locations and thus opening strokes of the valve closing element which deviate from one another occur with the said stop device. In addition, there is the risk that with a deformation of the stop surfaces occurring with increasing operating time as a result of non-uniform stopping, the injected fuel quantity may no longer be sufficiently accurately metered.

ADVANTAGES OF THE INVENTION

The electromagnetically actuable valve according to the invention has, in contrast with the above, the advantage that the opening stroke of the valve closing element is not influenced by a skew position of the valve needle. In addition, a possibly required stop plate which generates a residual air gap and is not magnetisable is omitted. The large axial spacing between the guidance on the valve closing element and the armature guidance additionally largely prevents a skew position of the valve needle.

It is particularly advantageous if the valve closing element has an outwardly bent surface in the region touched in the opening position of the valve by the stop rod, in order, even with relatively large skew positions of the valve needle, to guarantee an exact stop location and thus a constant opening stroke of the valve closing element.

For the same reason, it is also advantageous if the stop rod has an outwardly bent surface on its end side facing the valve closing element.

It is particularly advantageous to construct the stop rod of a non-magnetizable material so that no influence on the magnetic field arises from the stop rod.

It is also advantageous if the stop rod has a hardened surface, in particular on the end face facing the valve closing element, for the purpose of reducing wear.

It is equally advantageous if a displacement sheath which has throughflow openings in the direction of flow for fuel and is connected to the stop rod is displaceably mounted in the core so that a simple and rapid assembly of the stop rod and a problem-free fuel flow through the displacement sheath is guaranteed.

It is advantageous if the displacement sheath has impressions running in the axial direction and pointing radially inwards which form contact surfaces between the displacement sheath and the stop rod and thus permit the secure connection of both components, whether by welding, soldering or by pressing. Above all, a displacement sheath of this construction permits, despite its low expenditure in terms of production technology, a problem-free through-flow of fuel.

It is particularly advantageous if the displacement sheath serves as a rest to a return spring acting on the valve closing element so that a simple and cost-effective assembly is obtained.

It is equally advantageous to use as a rest for the return spring acting on the valve closing element a bearing bush which is pressed into the core downstream of the displacement sheath and has openings in the direction of flow for the stop rod and the fuel. In this way, a setting of the spring force of the return spring which is independent of the press-in depth or screw-in depth of the displacement sheath into the core is guaranteed.

When manufacturing the valve according to the invention it is particularly advantageous if, in a first process step, a valve needle consisting of a valve closing element, connection pipe and armature is inserted into a connection component which is connected to the intermediate part and the core and which connects the intermediate part to the valve seat body downstream. In a next process step, the valve seat body is inserted into a retaining bore, constructed concentrically with respect to the valve longitudinal axis, of the connection component and the axial clearance of the valve needle consisting of the preselected sum of a valve needle stroke and residual air gap is determined by the axial position of the valve seat body in the retaining bore in that the valve seat body is tightly connected to the connection component. The setting of the stroke of the valve closing element and thus also of the injected fuel quantity as well as of the force of the return spring occurs in a following process step by means of the screw-in depth or press-in depth into the flow bore of the displacement sheath connected to the stop rod so that, in total, a simple and exact setting of residual air gap and valve needle stroke is obtained.

In order to be able to set the residual air gap and the valve needle stroke accurately and simply, it is likewise advantageous for the manufacture of the valve, according to the invention, if in a first process step a valve needle consisting of the valve closing element, connection pipe and armature is inserted into the connection component connected to the intermediate part and the core and in a subsequent process step the residual air gap is determined by the screw-in depth or press-in depth into the flow bore of the displacement sheath connected to the stop rod. In a following process step, the valve seat body is initially inserted into the retaining bore, the axial positioning of the valve seat body serving for setting the valve needle stroke and thus also for setting the injected fuel quantity as well as the force of the return spring, and in a concluding process step the valve seat body is tightly connected to the connection component.

If the bearing bush serves as a rest for the return spring, it is particularly advantageous for the manufacture of a valve according to the invention if in a first process step a valve needle consisting of the valve closing element, connection pipe and armature is inserted into the connection component connected to the intermediate part and the core. In a subsequent process step, the valve seat body is inserted into the retaining bore, the axial clearance of the valve needle consisting of the preselected sum of valve needle stroke and residual air gap is determined by the axial position of the valve seat body and the retaining bore and subsequently the valve seat body is tightly connected to the connection component. The force of the return spring is set in a following process step in that the bearing bush is pressed into the flow bore of the core. In a further process step, the stroke of the valve closing element is set by the screw-in depth or press-in depth into the flow bore of the displacement sheath connected to the stop rod. This means that in this process a setting of the force of the return spring which is independent of the screw-in depth or press-in depth of the displacement sheath can be carried out.

A different advantageous process for manufacturing a valve according to the invention having a bearing bush serving as a rest for the return spring is described as follows in a first process step the bearing bush is first inserted into the flow bore and subsequently a valve needle consisting of the valve closing element, connection pipe and armature is inserted into the connection component connected to the intermediate part and the core. The residual air gap is determined in a subsequent process step by the screw-in depth or press-in depth into the flow bore of the displacement sheath connected to the stop rod. In a following process step, the valve seat body is first inserted into the retaining bore, the axial positioning of the valve seat body serving for setting the valve needle stroke and the valve seat body being subsequently tightly connected to the connection component. The setting of the force of the return spring occurs in a further process step in that the press-in depth of the bearing bush in the flow bore is changed.

DRAWING

Exemplary embodiments of the invention are illustrated in simplified form in the drawing and explained in greater detail in the subsequent description.

FIG. 1 shows a first exemplary embodiment of a valve constructed according to the invention, FIG. 2 shows an enlarged section through the displacement sheath along the line II—II in FIG. 1 and FIG. 3 shows a second exemplary embodiment of the valve constructed according to the invention.

DESCRIPTION OF THE EXEMPLARY EMBODIMENTS

Figure 1:
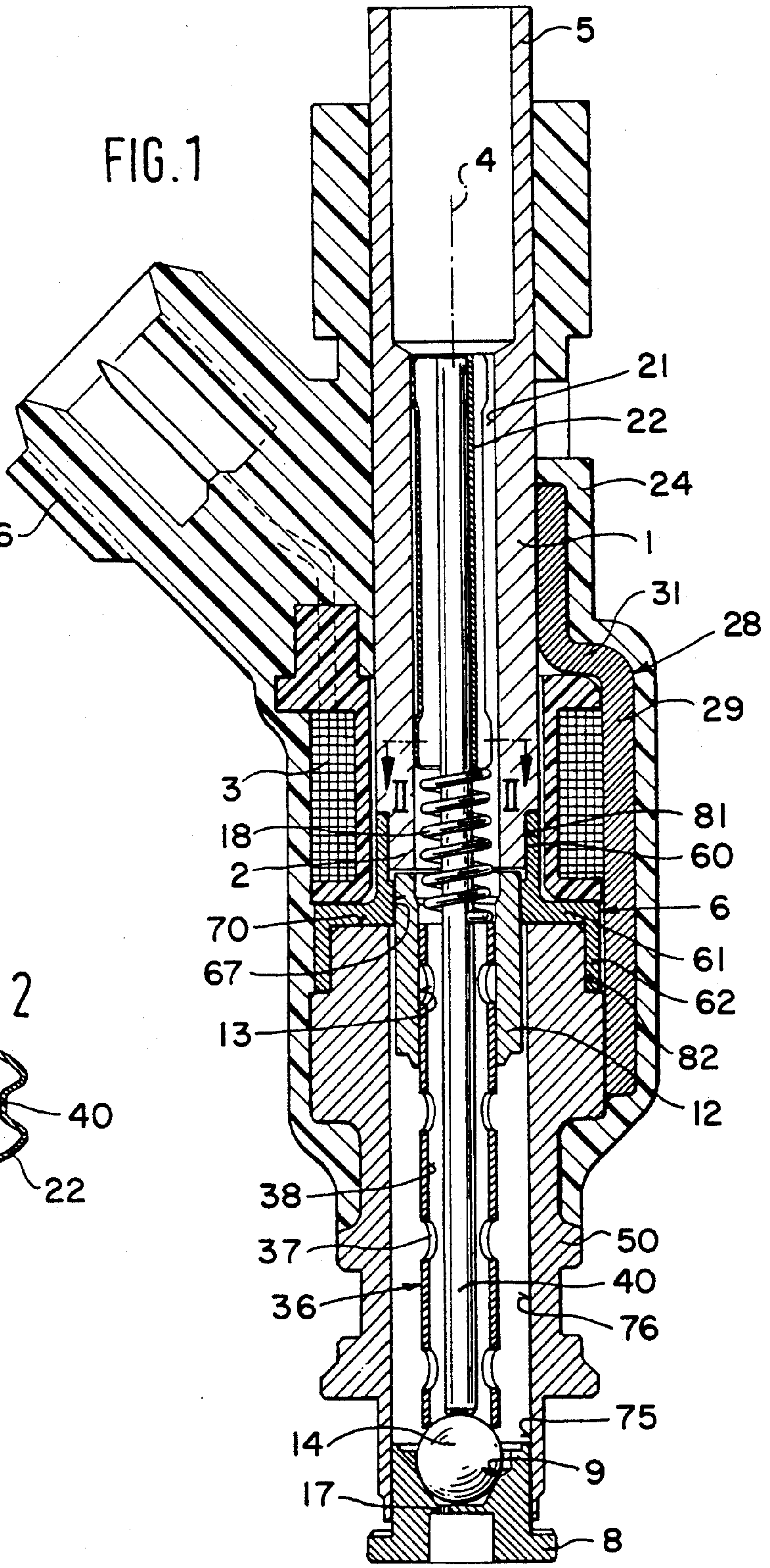

The electromagnetically actuable valve, illustrated for example in FIG. 1, in the form of an injection valve for fuel as a unit of a fuel injection system of a mixture-compressing spark-ignited internal combustion engine has a pipe-shaped metal core 1 of ferromagnetic material on whose lower core end 2 a magnetic coil 3 is arranged. At the upper end of the core 1 is a fuel inlet connecting piece 5. Adjoining the core end 2, a pipe-shaped intermediate part 6 is connected tightly to the core 1, and concentrically with respect to the valve longitudinal axis 4, for example by soldering or welding. The intermediate part 6 is produced for example from non-magnetic sheet metal which is drawn and has a first connection section 60 running coaxially with respect to the valve longitudinal axis, with which connection section 60 the said intermediate part 6 completely embraces the core end 2 and is connected tightly thereto. The connection section 60 has on its inner bore facing away from the fuel inlet connecting piece 5 a slide bore 67 provided with a smaller diameter, into which bore a cylindrical armature 12 projects and by which the armature 12 is guided. The axial extension of the slide bore 67 is small in comparison to the axial length of the armature 12, the said length is approximately 1/15 of the length of the armature.

A collar 61 which extends radially outwards from the first connecting section 60 leads to a second connecting section 62 of the intermediate part 6 which has an extension running coaxially with respect to the valve longitudinal axis 4 and partially projects beyond a tubular cylindrical connecting component 50 in the axial direction and is tightly connected to the latter, for example by soldering or welding. The diameter of the second connecting section 62 is thus larger than the diameter of the first connecting section 60 so that in the mounted state the tubular connecting component 50 rests with an end face 70 against the collar 61. In order to permit small external dimensions of the valve, the first connecting section 60 embraces a retaining shoulder 81 of the core end 2 which has a smaller outer diameter than the core 1 and the second connecting section 62 embraces a retaining shoulder 82, likewise with a smaller outer diameter than in the adjacent area, of the connecting component 50. The connecting component 50 is produced from ferromagnetic material and has a retaining bore 75 facing away from the end face 70, into which retaining bore a valve seat body 8 is tightly inserted, for example by pressing in, a screw connection, welding or soldering. The retaining bore 75 is continuous with a transitional bore 76 which extends as far as the end face 70.

Facing the core end 2, the metal valve seat body 8 has a fixed valve seat 9. The arrangement in a row of core 1, intermediate part 6, connecting component 50 and valve seat body 8 constitutes a rigid metal unit. One end of a thin-walled round connecting pipe 36 which projects into the transitional bore 76 is inserted into a securing orifice 13 of the armature 12 and is connected to the latter. Connected to its other end facing the valve seat 9 is a valve closing element 14 which can be, for example, in the shape of a sphere, a hemisphere or of a different shape. The connection between connecting pipe 36 and armature 12 as well as valve closing element 14 and connecting pipe 36 is made advantageously by welding or soldering.

A stop rod 40 which projects into the connecting pipe 36 and touches the valve closing element 14 in the opening position of the valve which has any desired, for example circular, cross-sectional shape is rigidly connected to a displacement sheath 22. The displacement sheath 22 has, as illustrated in enlarged form in FIG. 2 as an exemplary embodiment, radially inwardly directed impressions 25 running in the axial direction. These, for example, three illustrated impressions 25 form contact surfaces between the displacement sheath 22 and the stop rod 40 so that on the one hand a simple rigid connection of both components is made possible by welding, soldering or by pressing, but on the other hand a problem-free fuel flow through the displacement sheath 22 is guaranteed.

In the contact area which is touched by the stop rod 40 in the opening position of the valve, the surface of the valve closing element 14 is bent outwards. The stop rod 40 is made of a non-magnetisable material and its surface is hardened in particular on its face facing the valve closing element 14.

A return spring 18 facing away from the valve closing element 14 and projecting into a flow bore 21 of the core 1 rests against the displacement sheath 22. The other end, projecting into the stepped securing orifice 13 which penetrates the armature 12, of the return spring 18 is supported on an end face of the connecting pipe 36. The spring force of the return spring 18 is set by means of the axial positioning of the displacement sheath 22 screwed in or pressed into the flow bore 21.

At least one part of the core 1 and the magnetic coil 3 are enclosed along their entire axial length by a plastic jacket 24 which also encloses at least a part of the intermediate part 6 and of the connecting pipe 36. The plastic jacket 24 can also be made by casting or injection moulding. At the same time an electrical connecting plug 26 is formed onto the plastic jacket 24, via which connecting plug 26 the electrical contacts to the magnetic coil 3 are made and thus it is excited.

The magnetic coil 3 is surrounded partially by at least one conducting element 28 serving as a ferromagnetic element for conducting the magnetic field lines, which conducting element is produced from ferromagnetic material and extends in the axial direction over the entire length of the magnetic coil 3 and at least partially surrounds the magnetic coil 3 in the circumferential direction.

The conducting element 28 is constructed in the form of a bow having a region 29 adapted to the contour of the magnetic coil, which region surrounds the magnetic coil 3 only partially in the circumferential direction and an end section 31 extending inwards in the radial direction, which end section partially embraces the core 1. A valve having a conducting element 28 is illustrated in FIG. 1.

The fuel flows from the fuel inlet connecting piece 5 through the armature 12 into an internal channel 38 of the connecting pipe 36 as well as via radial throughflow orifices 37 into the transitional bore 76 and from there to the valve seat 9, downstream of which in the valve seat body 8 there is at least one injection orifice 17 via which the fuel is injected into an inlet pipe or a cylinder of an internal combustion engine.

If two or more conducting elements 28 are provided, it may also be expedient for reasons of space to allow the electrical connecting plug 26 to extend in one plane which is rotated through 90°, that is to say is perpendicular to the plane illustrated here.

Figure 2:
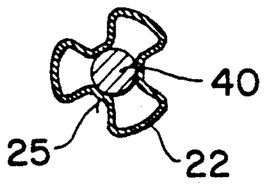
Figure 3:
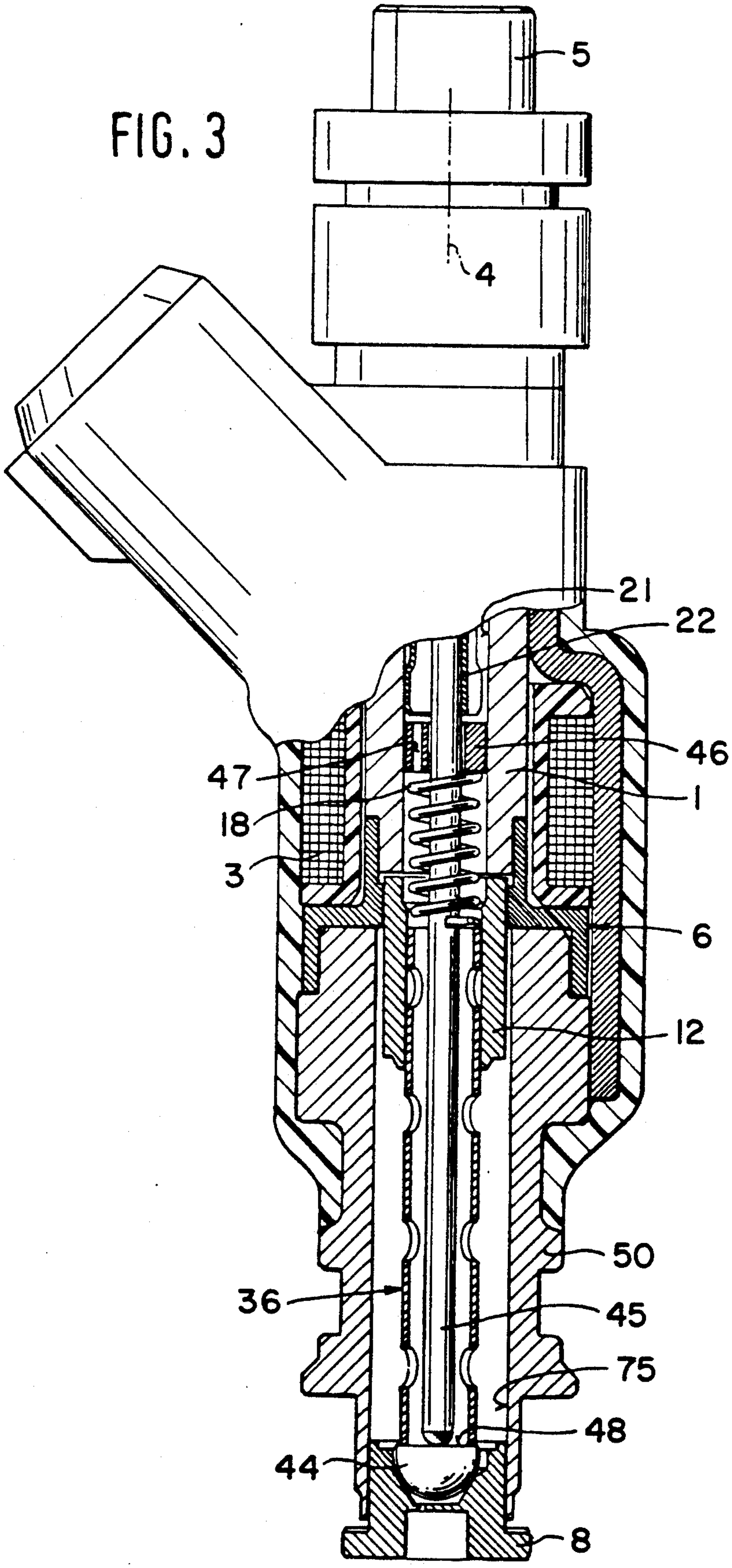

In FIG. 3, a second exemplary embodiment of the invention is illustrated in which components which are the same and have the same functions as those in FIGS. 1 and 2 are characterised by essentially the same reference symbols. A valve closing element 44 has a plane surface 48 in the region touched in the opening position of the valve by a stop rod 45. Opposite this, the surface of the stop rod 45 is sloped outwards at its end side facing the valve closing element 44.

A bearing bush 46 pressed into the flow bore 21 of the core 1 between displacement sheath 22 and return spring 18 serves as a rest for the return spring 18 which acts on the valve closing element 44 by means of the connecting pipe 36. In the axial direction the bearing bush 46 has an orifice, concentric with respect to the valve longitudinal axis 4, for the stop rod 45 as well as at least one flow orifice 47 which serves for the fuel flow through the bearing bush 46.

When mounting the valve according to the invention the size of the residual air gap and of the stroke, which influences the injected fuel quantity, of the valve closing element 14 must be set as simply and exactly as possible. For this reason, it is advantageous in a first process step, to insert a valve needle consisting of valve closing element 14, connecting pipe 36 and armature 12 into the connecting component 50 connected to the intermediate part 6 and the core 1, and in a next process step to insert the valve seat body 8 into the retaining bore 75 and to determine the axial clearance, consisting of the preselected sum of the valve needle stroke and residual air gap, of the valve needle by means of the axial position of the valve seat body 8 in the retaining bore 75. After this, the valve seat body 8 is tightly connected to the connecting component 50. The setting of the stroke of the valve closing element 40 and the force of the return spring 18 occurs in a following process step by means of the screw-in or press-in depth into the flow bore 21 of the displacement sheath 22 connected to the stop rod 40.

A different process which is advantageous for the accurate and simple setting of the residual air gap, of the valve needle stroke and of the force of the return spring 18 of a valve constructed according to the invention consists in inserting, in a first process step, a valve needle consisting of a valve closing element 14, connecting pipe 36 and armature 12, into the connecting component 50 connected to the intermediate part 6 and to the core 1, and in a subsequent process step determining the residual air gap by means of the screw-in or press-in depth into the flow bore 21 of the displacement sheath 22 connected to the stop rod 40. In a following process step, the valve seat body 8 is first inserted into the retaining bore 75, the axial positioning of the valve seat body 8 serving for setting the valve needle stroke and thus also the injected fuel quantity as well as the force of the return spring 18. Subsequently, the valve seat body 8 is tightly connected to the connecting component 50.

If, as FIG. 3 illustrates, the bearing bush 46 serves as a rest for the return spring 18, it is advantageous for the assembly of the valve according to the invention to insert, in a first process step, a valve needle, consisting of valve closing element 44, connecting pipe 36 and armature 12, into the connecting component 50 connected to the intermediate part 6 and to the core 1 and in a next process step to insert the valve seat body 8 into the retaining bore 75 and to determine the axial clearance, consisting of the preselected sum of valve needle stroke and residual air gap, of the valve needle by means of the axial position of the valve seat body 8 in the retaining bore 75. After this, the valve seat body 8 is tightly connected to the connecting component 50. In a following process step, the force of the return spring 18 is set by pressing the bearing bush 46 into the flow bore 21 of the core 1. The setting of the stroke of the valve closing element 44 occurs in a further process step by means of the screw-in or press-in depth into the flow bore 21 of the displacement sheath 22 connected to the stop rod 45.

A different advantageous process for manufacturing a valve according to the invention using a bearing bush 46, as illustrated in FIG. 3, serving as a rest for the return spring 18 consists in first inserting the bearing bush 46 into the flow bore 21 in a first process step and subsequently inserting a valve needle, consisting of valve closing element 44, connecting pipe 36 and armature 12, into the connecting component 50 connected to the intermediate part 6 and to the core 1. In a following process step, the residual air gap is determined by the screw-in or press-in depth into the flow bore 21 of the displacement sheath connected to the stop rod 45. In a following process step, the valve seat body 8 is first inserted into the retaining bore 75, the axial positioning of the valve seat body 8 serving for setting the valve needle stroke and thus also the injected fuel quantity. Subsequently, the valve seat body 8 is tightly connected tu the connecting component 50. The setting of the force of the return spring 18 occurs in a further process step by changing the press-in depth of the bearing bush 46 into the flow bore 21.

The central stop rod 40 or 45 of the valve according to the invention permits, independently of the skew position of the valve needle, a constant opening stroke of the valve closing element 14 or 44 and thus the assignment of an exactly metered fuel quantity. In conjunction with the positioning of the valve seat body 8 in the retaining bore 75, the displacement sheath 22 connected to the stop rod 40 or 45 permits during fitting into the flow bore 21 a simple and exact setting of the residual air gap and of the stroke of the valve closing element 14 or 44.

We claim:

1. An electromagnetically actuable valve for a fuel injection valve for fuel injection systems of mixture-compressing, spark-ignited combustion engines having a pipe-shaped core surrounded by a magnetic coil, the top end of said core being constructed as a fuel inlet connecting piece, an armature facing the core and a connecting pipe arranged concentrically with respect to the valve longitudinal axis and having a pipe wall which is connected at its one end to the armature and at its other end to a valve closing element that cooperates with a fixed valve seat, as well as a stop device which limits the opening path of the valve closing element, the stop device is constructed as a stop rod (40, 45) which is arranged concentrically with respect to the valve longitudinal axis, said stop rod projects into the connecting pipe (36) and in the opening position of the valve touches the valve closing element (14, 44).

2. A valve according to claim 1, in which the valve closing element (14) has an outwardly bent surface in the region touched by the stop rod (40) in the opening position of the valve.

3. A valve according to claim 2, in which the stop rod (40, 45) is constructed of non-magnetizable material.

4. A valve according to claim 2, in which the stop rod (40, 45) has a hardened surface.

5. A valve according to claim 2, which includes a displacement sheath (22) which is connected to said stop rod (40, 45) and displaceably mounted on said core, said displacement sheath includes a fuel flow through opening in the flow direction.

6. A valve according to claim 1, in which the stop rod (45) has an outwardly bent surface on its end side facing the valve closing element (44).

7. A valve according to claim 6, in which the stop rod (40, 45) is constructed of non-magnetizable material.

8. A valve according to claim 6, in which the stop rod (40, 45) has a hardened surface.

9. A valve according to claim 6, which includes a displacement sheath (220 which is connected to said stop rod (40, 45) and displaceably mounted on said core, said displacement sheath includes a fuel flow through opening in the flow direction.

10. A valve according to claim 1, in which the stop rod (40, 45) is constructed of non-magnetizable material.

11. A valve according to claim 10, in which the stop rod (40, 45) has a hardened surface.

12. A valve according to claim 10, which includes a displacement sheath (22) which is connected to said stop rod (40, 45) and displaceably mounted on said core, said displacement sheath includes a fuel flow through opening in the flow direction.

13. A valve according to claim 1, in which the stop rod (40, 45) has a hardened surface.

14. A valve according to claim 13, in which the stop rod (40, 45) is hardened on its end face facing the valve closing element (14, 44).

15. A valve according to clam 1, which includes a displacement sheath (22) which is connected to sad stop rod (40, 45) and displaceably mounted on sad core, said displacement sheath includes a fuel flow through opening in the flow direction.

16. A valve according to claim 15, in which the displacement sheath (22) has impressions (25) running in the axial direction and pointing radially inwards.

17. A valve according to claim 16, in which the displacement sheath (22) serves as a rest to a return spring (18) acting on the valve closing element (14).

18. A valve according to claim 16, in which a bearing bush (46) is pressed into the core (1) downstream of the displacement sheath (22) and includes in the flow direction orifices for the fuel flow (47) and said stop rod (45), said bearing bush serves as a rest for the return spring (18) that acts on the valve closing element (44).

19. A valve according to claim 15, in which the displacement sheath (22) serves as a rest to a return spring (18) acting on the valve closing element (14).

20. A valve according to claim 15, in which a bearing bush (46) is pressed into the core (1) downstream of the displacement sheath (22) and includes in the flow direction orifices for the fuel flow (47) and said stop rod (45) said bearing bush serves as a rest for the return spring (18) that acts on the vale closing element (44).

21. A process for forming an electromagnetically actuable valve including a core (1), an intermediate part (6) connected at one end to said core and a connecting component (50) connected to said intermediate part from a housing with a fuel flow bore and a fuel inlet, and a coil surrounding said core and said intermediate part, comprising securing a displacement sheath (22) within said fuel flow bore with an end juxtaposed the fuel inlet, securing a stop rod (40, 45) to said displacement sheath, connecting a valve closing element (14), a connecting pipe (36) and an armature (12) to each other to form a valve needle, inserting a valve return spring in said housing juxtaposed said sheath, inserting said valve needle into said housing juxtaposed said return spring, inserting a valve seat body (8) into an end of said connecting component, determining an air gap between said valve seat body and said stop rod, and securing said valve seat body to said connecting component to fix said air gap between said stop rod and said valve seat body.

22. A process as claimed in claim 21, which comprises securing said valve seat body to said connecting component, determining the air gap between said stop and said valve seat body by movement of said stop rod with said displacement sheath, and then securing said displacement sheath within said flow bore.

23. A process as claimed in claim 22, which includes inserting a bearing bushing onto said stop rod between sad sheath (22) and said return spring, and determining the air gap between said valve seat body and an adjacent end of said stop rod by adjusting said displacement sheath within said flow bore and securing said displacement sheath in place subsequent to determining said air gap.

24. A process as claimed in claim 21, which comprises inserting a bearing bushing onto said stop rod between said sheath and said return spring and subsequent to determining the air gap securing said valve seat body in place, adjusting said bearing bushing against said return spring to produce a force on the valve needle to set a valve needle stroke.

* * * * *